US008150734B2

(12) United States Patent
Dangaltchev

(10) Patent No.: US 8,150,734 B2
(45) Date of Patent: Apr. 3, 2012

(54) ESTIMATING ADVERTISING PRICES FOR AN INCUMBENT CONTENT PROVIDER

(75) Inventor: Tchavdar Dangaltchev, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 823 days.

(21) Appl. No.: 12/145,223

(22) Filed: Jun. 24, 2008

(65) Prior Publication Data

US 2009/0319333 A1 Dec. 24, 2009

(51) Int. Cl.
*G06Q 30/00* (2012.01)

(52) U.S. Cl. ............... 705/14.69; 705/14.41; 705/14.42; 705/14.43; 705/14.45; 705/14.46; 705/14.48; 705/14.52

(58) Field of Classification Search ..................... 705/14
See application file for complete search history.

(56) References Cited

U.S. PATENT DOCUMENTS 6,269,361 B1 * 7/2001 Davis et al. ........................... 1/1
7,043,450 B2 * 5/2006 Velez et al. ..................... 705/37
7,072,848 B2 7/2006 Boyd
7,302,410 B1 11/2007 Venkatraman
2002/0169760 A1 * 11/2002 Cheung et al. .................... 707/3
2005/0144064 A1 6/2005 Calabria
2006/0095281 A1 5/2006 Chickering
2006/0190336 A1 * 8/2006 Pisaris-Henderson et al. . 705/14
2006/0212350 A1 9/2006 Ellis
2006/0224445 A1 10/2006 Axe
2007/0005421 A1 * 1/2007 Labio et al. ..................... 705/14
2007/0027762 A1 * 2/2007 Collins et al. ................... 705/14
2007/0130004 A1 6/2007 Borgs
2007/0214050 A1 9/2007 Schoen
2007/0219895 A1 9/2007 Cooper

OTHER PUBLICATIONS

"Dynamics of Bid Optimization in Online Advertisement Auctions," Christian Borgs, et al., WWW 2007, May 8-12, 2007, Banff, Canada; 10 pages.
"Pay-per-Action Model for Online Advertising," Mohammad Mahdian and Kerem Tomak, Yahoo Research, (No date listed); 8 pages.
"Introduction to Affiliate Marketing,", no authors or date listed, website: http://www.myinternetpaycheck.com/myip/members/Introduction.htm; 13 pages.

* cited by examiner

*Primary Examiner* — Michelle Tarae
*Assistant Examiner* — Vincent Cao
(74) *Attorney, Agent, or Firm* — Shook Hardy & Bacon LLP

(57) ABSTRACT

Computer-readable media and a computer system for correcting bid estimates that are calculated from stored data encompassing an incumbent customer's participation in a keyword auction are provided. Initially, input criteria is received, which includes customer-history data and a candidate position, within a ranking of incumbent customers competing to display an advertisement, that is attractive to the incumbent customer. A corrected rank model of the competing incumbent customers' ranking is generated, which effectively discounts the stored data related to the incumbent content provider. The corrected rank model is utilized to predict an adjusted average position of the incumbent content provider, within the ranking of the competing incumbent customers, without physically extracting stored data associated therewith. A corrected price model that ignores the influence of the incumbent customer's participation in the advertising auction is then constructed. This corrected price model and the candidate position facilitate predicting the corrected bid estimate.

17 Claims, 7 Drawing Sheets

UPDATE PERFORMANCE ESTIMATES...

FILTER BY: [          ]  IN COLUMN: KEYWORD  [>] [GO] [RESET]

| KEYWORD | STATUS | MATCH TYPE | CURRENT BID (MAX. CPC) | ADJ. AVG. POSITION | LAST INPRES. | SPEND | IMPRESSIONS | CLICKS | CTR% | AVG. POSITION | CONVERSIONS | ADJ. CPC |
|---|---|---|---|---|---|---|---|---|---|---|---|---|
| FLOWER | ACTIVE | BROAD | 0.10 | 2.35 | 2500 | 0.00 | | 0 | 0.00 | 0.00 | 0 | 0.00 |

505 — KEYWORD column
535 — CURRENT BID
520 — ADJ. AVG. POSITION
525 — LAST INPRES.
530 — ADJ. CPC
510 — filter bar
500 — form

UPDATE PERFORMANCE ESTIMATES...

| KEYWORD | STATUS | MATCH TYPE | CURRENT BID (MAX. CPC) | ADJ. AVG. POSITION | LAST INPRES. | SPEND | IMPRESSIONS | CLICKS | CTR% | AVG. POSITION | CONVERSIONS | ADJ. CPC |
|---|---|---|---|---|---|---|---|---|---|---|---|---|
| FLOWER | ACTIVE | BROAD | 0.10 | 2.35 | 2500 | $4.70 | 2,813 | 94 | 3.35 | 3.66 | 0 | 0.05 |

FILTER BY: ☐   IN COLUMN: KEYWORD ▼  GO  RESET

ESTIMATING ADVERTISING PRICES FOR AN INCUMBENT CONTENT PROVIDER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Online search engine advertising is become an increasingly important piece of the marketing campaigns and sales strategies of many client businesses, or content providers. Often, the online search engine advertising is typically sold via keyword auctions (e.g., Google's AdWords, Yahoo's Search Marketing, and MSN's AdCenter). During these keyword auctions, prospective content providers choose a set of keywords relevant to their products, and for each keyword, each content provider submits a bid representing an estimate of utility for presenting an ad impression when that keyword is displayed. These keyword auctions to place the ad impression at locations on a web page have become the main source of revenue for many search engines, or online publishers, as well as a large expenditure for the content providers aspiring to post their ad impressions. Accordingly, analyzing the behavior of these auctions is critical to supporting content providers such that they enjoy a sufficient return-on-investment when engaging in online advertising.

In one instance, online publishers may support content providers by offering a price-estimation tool that attempts to approximate a price for posting an ad impression with the search engine. But, these price-estimation tools are flawed in several respects, and thus, provide inaccurate estimates of price to the content provider. Frequently, inaccurate estimates result from using data related to incumbent customers, which are content providers that have previously participated in a keyword auction. This incumbent-customer data is recycled within the price-estimation tool. Accordingly, when the content provider submits a proposal to the price-estimation tool, the content provider is caused to effectively compete against itself during an approximation of a price for posting the ad impression with the search engine.

By way of example, let there be two incumbent customers bidding for a highest position in association with a particular keyword: customer A with bid $0.20; and customer B with bid $0.10. Customer A's ad is placed at position 1, while customer B's ad is placed at position 2. Using second-bid style pricing, customer A will pay $0.10 per click on an ad impression while customer B will pay $0.05 per click, which is the minimal floor price. If customer B submits a proposal to attain position 1 for the particular keyword, the price-estimation engine should estimate the bid to be $0.21. This is the same result that should be calculated for any new customer. But, because the price-estimation tool is unable to distinguish the data related to the incumbent customer A, a proposal from customer A to attain position 1 will likely deliver a suggested bid of $0.21. A more accurate suggested bid would be $0.11, enough to overcome customer B, but not more. These flaws with the price-estimation tool are exaggerated when the stored bid for an incumbent customer at position 1 is substantially more than the stored bid associated with the next incumbent customer. This overestimation may directly lead to financial loss for online publishers. In particular, the incumbent customers have become increasingly unsatisfied when the actual costs for advertising at a search engine do not correspond to budgets created based on the inaccurate estimates.

Present techniques do not offer sufficient techniques for correcting bid estimates that are derived from data that include information related to participation of an incumbent customer in a keyword auction. Accordingly, implementing an algorithm to effectively discount bid data related to a content provider requesting a price estimate would uniquely increase the accuracy of a price-estimation tool and would enhance a content provider's experience when establishing an online advertising budget.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention generally relate to computer-readable media and a computer system for employing a procedure to correct bid estimates that are derived from bid data, which include an incumbent content provider's participation in a keyword auction. In particular, the procedure is carried out by implementing an algorithm to effectively discount the incumbent content provider's bid data to provide an accurate price estimate, thereby enhancing the incumbent content provider's experience when establishing an online advertising budget.

In an exemplary embodiment of the present invention, the accurate price estimate is generally based on an adjusted position of an ad impression on a web page. By adjusting the position of the ad impression, a number of ad impressions being display and/or the number of selections applied to the displayed ad impressions are effected. These effects drive an adjustment to a cost-per-click value. Based on the adjusted cost-per click value and the number of selections of the displayed ad impression, a monthly cost for advertising at the adjusted position may be calculated. Accordingly, the incumbent content provider may compare its budget with the monthly cost for the adjusted position of its ad impression to better optimize advertising expenditures.

In embodiments, the adjusted cost-per-click value is derived for the subject incumbent content provider, and calculated from data related to a grouping of incumbent customers competing to surface an ad impression on a page. The calculation of the adjusted cost-per-click value is invoked upon the incumbent content provider submitting input criteria. Typically, the input criteria includes customer-history data collected by a search engine and a candidate position. The candidate position is a position within a ranking of the competing incumbent customers that is attractive to the incumbent content provider. A price-estimation procedure may be performed utilizing the input criteria and stored bid data for the competing incumbent customers, of which the incumbent content provider is a member.

Upon executing the price-estimation procedure, a corrected rank model of the ranking of the competing incumbent customers is generated. The corrected rank model effectively does not consider the bid data of the incumbent content provider. Further, the corrected rank model is utilized to predict an adjusted average position of the incumbent content provider within the ranking of the competing incumbent customers without physically extracting bid results associated therewith. A corrected price model may be generated, which ignores the influence of participation of the incumbent content provider in an advertising auction in conjunction with the participation of the competing incumbent customers. The corrected price model and the candidate position are utilized to predict the adjusted cost-per-click value for the incumbent content provider. The adjusted cost-per-click value may be stored in association with the incumbent content provider and/or presented at the UI display.

BRIEF DESCRIPTION OF THE DRAWINGS

The present invention is described in detail below with reference to the attached drawing figures, wherein.

DETAILED DESCRIPTION

Figure 1:
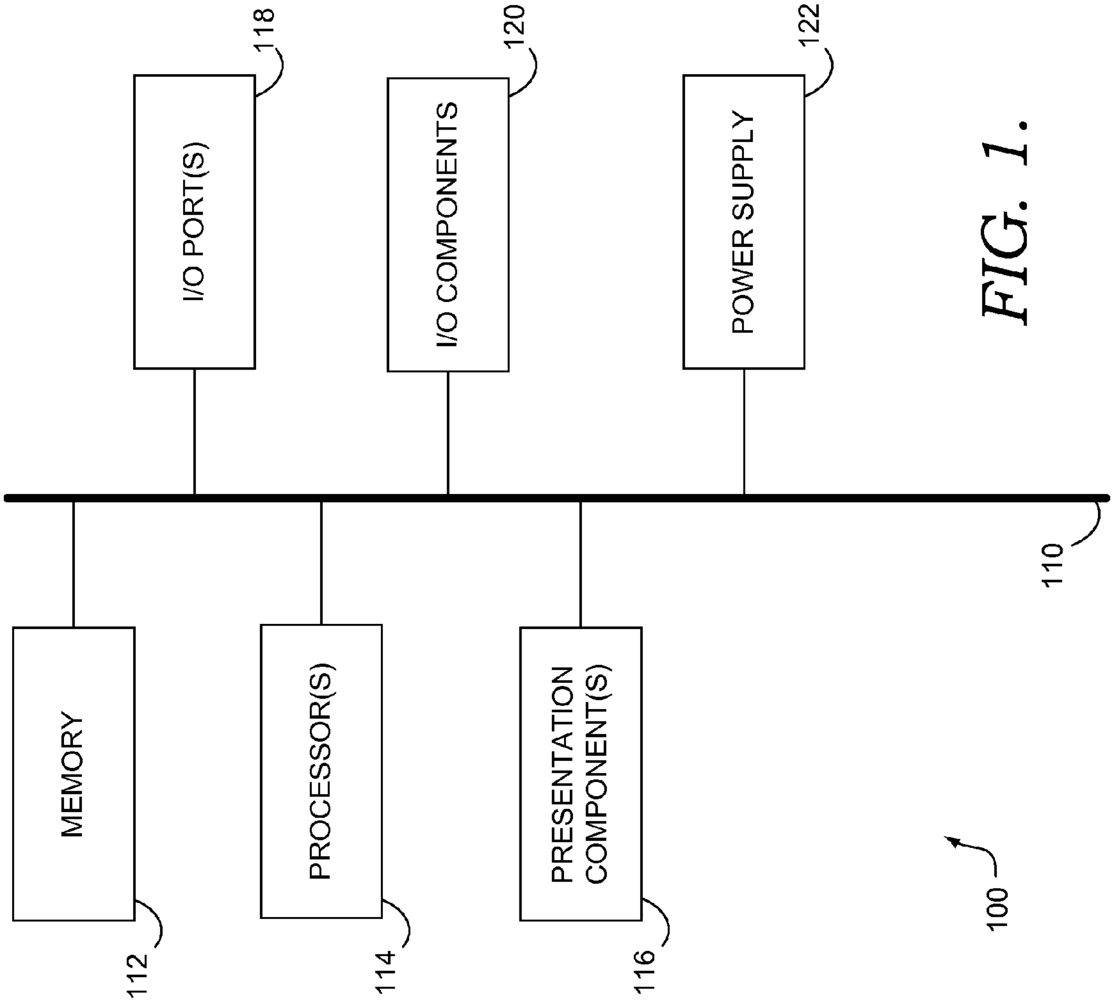
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Accordingly, in one embodiment, the present invention relates to computer-executable instructions, embodied on one or more computer-readable media, that perform a method for determining an adjusted average position of a subject incumbent content provider within a ranking of incumbent customers competing to surface an ad impression on a page. Initially, the method includes receiving customer-history data from the incumbent content provider at an online publisher. Typically, the customer-history data satisfies input criteria solicited at a UI display. A position-estimation procedure may be executed to ostensibly prevent the incumbent content provider from competing against itself during a hypothetical keyword auction. The position-estimation procedure includes, but is not limited to, the following steps: generating a corrected rank model simulating the ranking of the competing incumbent customers absent consideration of the incumbent content provider; and utilizing the corrected rank model to predict the adjusted average position of the incumbent content provider within the ranking without physically extracting bid results associated therewith from storage at the online publisher.

In particular embodiments, the position-estimation procedure further includes estimating a minimum position and a maximum position of the simulated ranking by identifying positions at which a stored model substantially deviates from a corrected rank model, and, based on the customer-history data, the minimum position, and the maximum position ascertaining the adjusted average position within the simulated ranking consistent with the corrected rank model. Typically, the stored model considers bid results supplied by the incumbent content provider. The adjusted average position may be revealed to the incumbent content provider at the UI display. In these embodiments, the input criteria for estimating the minimum position and the maximum position include a recorded average position, of the incumbent content provider, within the ranking of the stored model. Also, the input criteria for ascertaining the adjusted average position includes a candidate position proposed by the incumbent content provider and a percent participation in advertising auctions.

In another embodiment, aspects of the present invention involve computer-readable media having computer-executable instructions embodied thereon that, when executed, perform a method for determining an adjusted cost-per-click value associated with a candidate position submitted by a subject incumbent content provider within a grouping of incumbent customers competing to surface an ad impression on a page. Initially, the method includes receiving customer-history data from the incumbent content provider at an online publisher. Typically, the customer-history data satisfies input criteria solicited at a UI display. A price-estimation procedure may be executed, where the procedure includes, but is not limited to generating a corrected price model, and utilizing the corrected price model and the submitted candidate position to predict the adjusted cost-per-click value for the incumbent content provider at the candidate position without physically removing bid results associated with the incumbent content provider from consideration. Generally, the corrected price model is a theoretical bid structure that ignores the influence of participation of the incumbent content provider on an advertising auction in conjunction with the competing incumbent customers.

In one embodiment, the price-estimation procedure further includes calculating a cost-per-click modifier from a recorded average cost-per-click diminished based on a separation between the recorded average cost-per-click and a bid submitted by the incumbent content provider. Generally, the recorded average cost-per-click is provided by the incumbent content provider as part of the input criteria. In a second embodiment, the price-estimation procedure further includes ascertaining the adjusted cost-per-click value by reducing the recorded average cost-per-click by the cost-per-click modifier tuned with various derived parameters. Typically, the adjusted cost-per-click value is revealed to the incumbent content provider at the UI display, as indicated at block 450 in FIG. 4.

In yet another embodiment, the present invention encompasses a computer system embodied on one or more computer storage-media, having computer-executable instructions provided thereon. Generally, the computer system is configured for performing a method for deriving an adjusted cost-per-click value for a subject incumbent content provider within a grouping of incumbent customers competing to surface an ad impression on a page. Initially, the computer system includes a server that accommodates an input component, a position-adjustment component, and a cost-per-click adjustment component. The server is capable of invoking a price-estimation procedure upon receiving input criteria from an incumbent content provider. The price-estimation procedure may be capable of determining the adjusted cost-per-click value and is implemented on, at least, the input component, the position-adjustment component, and the cost-per-click adjustment component. The input component receives input criteria from the incumbent content provider. Typically, the input criteria include customer-history data collected by the server and a candidate position within a ranking of the competing incumbent customers that is attractive to the incumbent content provider.

The position-adjustment component generates a corrected rank model of the ranking of the competing incumbent customers absent consideration of the incumbent content provider. In instances, the position-adjustment component further utilizes the corrected rank model to predict an adjusted average position of the incumbent content provider within the ranking without physically extracting bid results associated therewith from storage at the server. The cost-per-click adjustment component generates a corrected price model that ignores the influence of participation of the incumbent content provider in an advertising auction in conjunction with the competing incumbent customers. In instances, the cost-per-click adjustment component further utilizes the corrected price model and the candidate position to predict the adjusted cost-per-click value for the incumbent content provider. Often the server is operably coupled to a presentation device that reveals the adjusted cost-per-click value at the UI display.

The present invention is generally related to performing an analysis of bid data that includes bids submitted by incumbent customers competing to surface an ad impression on a page, such as a web page published in the Internet by an online publisher. But, the phrase "bid data" is not meant to be limiting and may encompass any information related to an advertising auction, frequency and position of ad impressions, user interaction with the ad impressions, and the like. In one embodiment, the bid data may include user-actions, or clicks, provided in association with one or more competing incumbent customers that are collected by a search engine.

As discussed above, a subject incumbent content provider, who is a member of the competing customers, may desire to retrieve a price estimate in response to entering a candidate position that is desired by the incumbent content provider. The price estimate being generated may be any approximation of cost to the content provider for surfacing an ad impression. Further, the content provider, as well as the competing incumbent customers, may be any private or public company, individual, or other entity that has participated in an advertising auction in association with a particular online publisher. The content provider may also enter customer-history data as part of the input criteria for calculating a price estimate.

In embodiment, the customer-history data may include, but is not limited to, information for estimating a minimum position and a maximum position utilized for calculating an adjusted average position within a ranking of competing customers and/or an adjusted cost-per-click value corresponding to the candidate position, as more fully discussed below. In one embodiment, this information may include the number of times an ad impression associated the subject content provider's account is surfaced on a web page. This information may also include a total number of times any ad impression from any competing content providers is surfaced in association with a target keyword. This information may further include, a bid value offered by the subject content provider in an advertising auction and the average cost-per-click (CPC), which is the actual price being paid in association with the bid. In one instance, the CPC payment amount is equal to the proximate lower bidder (i.e., a second-bid style pricing).

Although various different articles of customer-history data requested as input criteria for the price-estimation procedure are listed herein, it should be understood and appreciated by those of ordinary skill in the art that other types of suitable information may be required/used, and that embodiments of the present invention are not limited to those items and forms of customer-history data described herein. Additionally, some or all of the customer-history data may be supplied the online publisher, a third-party search engine, or any other entity capable of distributing information to a price-estimation tool.

In another embodiment, the information within the customer-history data may comprise a recorded average position, of the incumbent content provider, within the ranking of the stored model, and a percent participation of the incumbent content provider in advertising auctions. In instances, customer-history data is captured and recorded by the online publisher and/or a third-party search engine, within a predetermined time frame, and conveyed to the incumbent content provider for submission.

This conveyance may be in the form of a monthly billing statement that includes an average position of an ad impression, submitted by the incumbent content provider, on a page (e.g., position 1, position 2, not surfaced, and the like). The average position may correspond to an average position of the incumbent content provider within a ranking of the incumbent customers competing to surface an ad impression on a page. The ranking is substantially an ordering based on a rank-per-revenue model that ranks the customers of an online publisher by a submitted bid value for each ad impression surfaced on a web page. Alternatively the ranking may be based on a product of the submitted bids and a number of times a user interacted with a surfaced impression, such as a click-through-rate (CTR) or any other action that may be recorded and measured against other customers. Conversely, as more fully discussed below, an adjusted average position, calculated by the price-estimation procedure of the present invention, refers to the incumbent content provider's estimated position within the ranking of the competing incumbent providers in a "corrected rank model." In an exemplary embodiment, the corrected rank model is substantially the initial ranking of competing incumbent customers with the bid results associated with a subject content provider discounted.

In embodiments, the ranking is generated upon receiving bids at an advertising auction. Generally, the advertising auction includes receiving bids submitted by the competing incumbent customers, and ranking the competing incumbent customers in an order such that a customer submitting a bid with a comparative high value is ranked highly. Accordingly, the ad impression uploaded by the customer submitting the comparative high value is surfaced, or posted at the web page, in a slot that is consistent with a high ranking. Likely, this slot is obviously displayed when the web page is being viewed by a user (e.g., a banner position, or a position at an upper portion of the web page).

Typically, the ranking is confined to competing incumbent customers that commonly indicated a single search term for invoking rendering of their respective ad impressions. Accordingly, in this example, the advertising auction conducted for collecting bids is a keyword auction. In practice, a keyword auction invites potential content providers to offer a bid to present a particular advertisement, or ad impression, upon one or more search engines receiving a query with a particular term/phrase included therein. These search engines may be inherently online publishers that accept money for posting ad impressions, or may contract with third-party online publishers that manage content providers and provide revenue to the search engine. Use of the phrase "online publisher" is not meant to be limiting but may encompass any entity or software that manages advertising auctions and/or conducts transactions that facilitate surfacing ad impressions.

Having briefly described an overview of embodiments of the present invention and some of the features therein, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
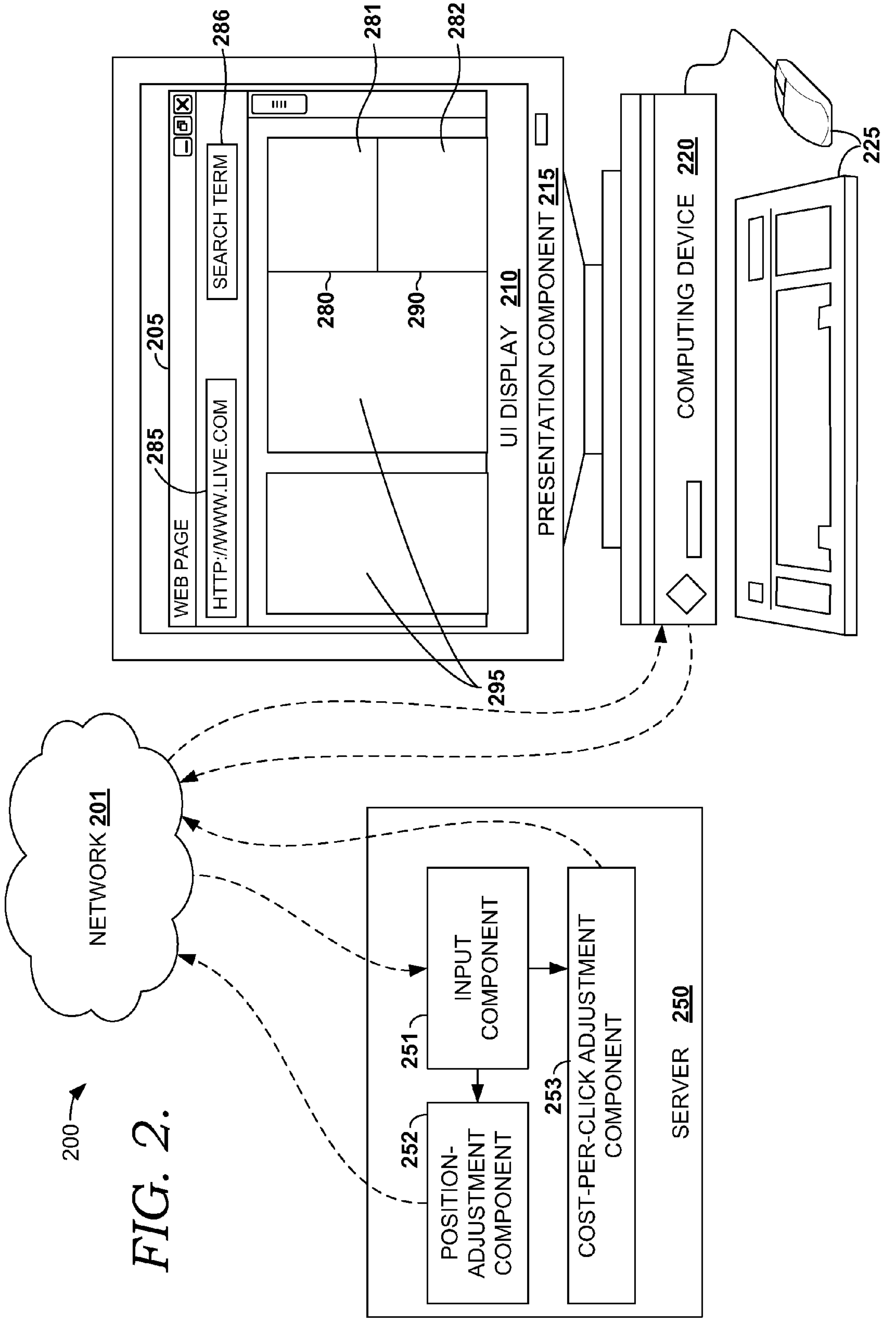
FIG. 2 is a schematic diagram of an exemplary system architecture suitable for use in implementing embodiments of the present invention, in accordance with an embodiment of the present invention.

Turning now to FIG. 2, a schematic diagram of an exemplary system architecture 200 suitable for use in implementing embodiments of the present invention is shown, in accordance with an embodiment of the present invention. It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

As illustrated, the system architecture 200 may include a distributed computing environment, where a computing device 220 is operably coupled to a server 250. In embodiments of the present invention that are practiced in the distributed computing environments, the operable coupling refers to linking the computing device 220 to the server 250, and other online components through appropriate connections. These connections may be wired or wireless. Examples of particular wired embodiments, within the scope of the present invention, include USB connections and cable connections over a network 201. Examples of particular wireless embodiments, within the scope of the present invention, include a near-range wireless network and radio-frequency technology. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.). Therefore it is emphasized that embodiments of the connections between the computing device 220 and the remote server 250, for instance, are not limited by the examples described, but embrace a wide variety of methods of communications. In another embodiment, the computing device may internally accommodate the functionality of the server 250, thereby alleviating dependence on wireless or wired connections.

Exemplary system architecture 200 includes the computing device 220 for, in part, supporting operation of the presentation component 215. In an exemplary embodiment, where the computing device 220 is a mobile device for instance, a presentation component 215 (e.g., a touchscreen display) may be disposed on the computing device 215. In addition, the computing device 220 may take the form of various types of computing devices. By way of example only, the computing device 220 may be a personal computing device (e.g., computing device 100 of FIG. 1), handheld device (e.g., personal digital assistant), a mobile device (e.g., laptop computer, cell phone, media player), consumer electronic device, various servers, and the like. Additionally, the computing device may comprise two or more electronic devices configured to share information therebetween.

In embodiments, as discussed above, the computing device 220 includes, or is operably coupled to, the presentation component 215 and/or one or more input devices 225. The computing device 220 is configured to present a UI display 210 on the presentation component 215. The presentation component 215 may be configured as any display device that is capable of presenting information to a user, such as a monitor, electronic display panel, touch-screen, liquid crystal display (LCD), plasma screen, one or more light-emitting diodes (LED), incandescent bulbs, a laser, an electroluminescent light source, a chemical light, a flexible light wire, and/or fluorescent light, or any other display type, or may comprise a reflective surface upon which the visual information is projected.

In one exemplary embodiment, the UI display 210 rendered by the presentation component 215 is configured to surface a web page 205 that is associated with a search engine 285 and/or content publisher. In embodiments, the web page may reveal resultant content discovered by searching the Internet with a search term 286. The search term 286 may be manually provided by a user at a query-entry area, or may be automatically generated by software. In addition, the search term 286 may relate to a keyword that invokes surfacing ad impressions 281 and 282, within positions 280 and 290, respectively.

As discussed above, the positions 280 and 290 may correspond to a rank of, or a bid submitted by, an incumbent customer to the online publisher 285. As shown, the position 280 is located in a high portion of the web page 205 than the position 290. Accordingly, a bid submitted by an incumbent customer associated with the ad impression 281 is likely greater than the bid submitted by an incumbent customer associated with the ad impression 282.

One or more input devices 225 are provided to accept user-initiated input(s) affecting, among other things, invoking the price-estimation upon completing the input criteria or performing an Internet query by submitting a search term for query. In an exemplary embodiment, the input device(s) 225 receives the user-initiated inputs at appropriate content-entry areas, control buttons, or windows, within the UI display 210, as more fully discussed with reference to FIGS. 5 and 6. Illustrative devices include a touchscreen display (e.g., contemporaneously employed as the presentation component 215), the I/O components 120 of FIG. 1, a mouse, a keyboard, a joystick, a key pad, a microphone, or any other component capable of receiving the user-initiated input. By way of example only, the input device(s) 225 controls the location of where a cursor tool hovers on the UI display 210 directing where data may be entered.

Although several differing configurations of the input device(s) 225 and presentation components 215 have been described above, it should be understood and appreciated by those of ordinary skill in the art that various types of input devices and presentation components that receive inputs and present information, respectively, may be employed as the input device(s) 225 and the presentation component 215, and that embodiments of the present invention are not limited to those input devices 225 and presentation components 215 that are shown and described.

The server 250, shown in FIG. 2, may take the form of various types of computing devices, such as, for example, the computing device 100 described above with reference to FIG. 1. By way of example only and not limitation, the server 250 may be a personal computer, desktop computer, laptop computer, consumer electronic device, handheld device (e.g., personal digital assistant), various remote servers, processing equipment, and the like. It should be noted, however, that the invention is not limited to implementation on such computing devices but may be implemented on any of a variety of different types of computing devices within the scope of embodiments of the present invention.

Further, in one instance, the server 250 is a search engine designed for searching for information on the Internet for gathering Internet search results in response to a user-submitted query that includes at least one search term 286 corresponding to a keyword that invokes surfacing the ad impressions 281 and 282. In one embodiment, the search engine includes one or more web crawlers that mine available data (e.g., newsgroups, databases, or open directories) accessible via the Internet and build a table containing web addresses along with the subject matter of web pages identified as the search results that are relevant to search terms within the user-submitted query. The search engine may be accessed by Internet users through a web-browser application represented by the web page 205. Accordingly, the users may conduct an Internet search by submitting search terms 286 at a query-entry area on a UI display presented on the web-browser application that is associated with the search engine. Further, the search engine may then facilitate retrieving a set of search results (e.g., listing, table, ranked order of web addresses, and the like) that match the user's search terms 286 and displaying the search results as content 295.

In embodiments, the server 250 includes an input component 251, a position-adjustment component 252, and a cost-per-click adjustment component 253. In operation, the components 251, 252, and 253 are designed to implement a price-estimation procedure for ostensibly preventing the incumbent content provider from competing against itself during a hypothetical keyword auction. In particular, implementing the price-estimation procedure derives the adjusted cost-per-click value for a subject incumbent content provider of the incumbent customers competing to surface an ad impression (e.g., the ad impressions 281 and 282) at the web page 205.

Figure 6:
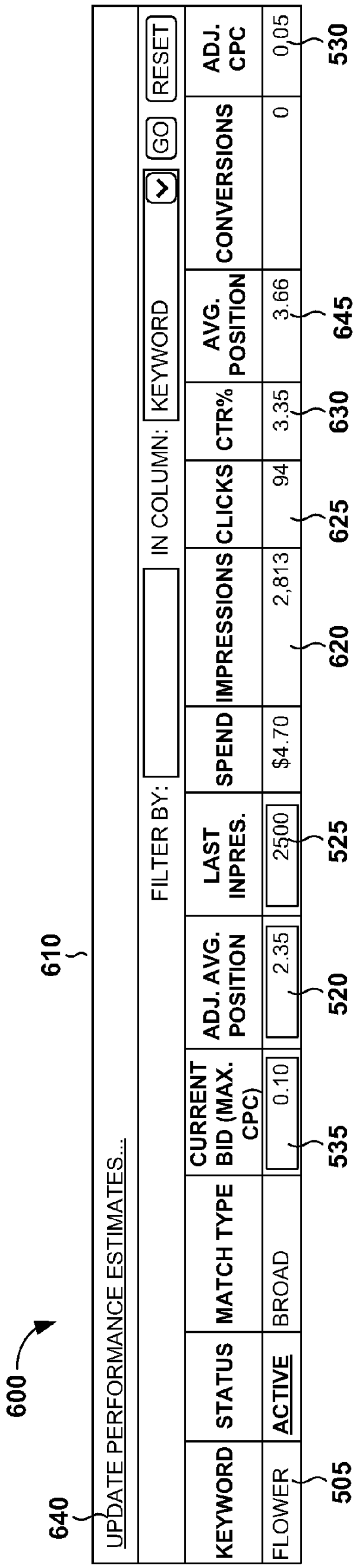

Initially, the input component 251 is configured for receiving input criteria from the incumbent content provider. As discussed above, the input criteria include customer-history data collected by the server 250 and a candidate position within a ranking of the competing incumbent customers that is attractive to the incumbent content provider. Referring briefly to FIG. 6, an illustrative screen display 600 of exemplary user interface (UI) 610 for receiving input criteria is shown, in accordance with an embodiment of the present invention. The exemplary UI 610 allows the incumbent content provider to submit various information related to customer-history data. That information includes, but is not limited to, the following: a keyword 505, a last ad impression 525 surfaced, a current bid value 535; an average position within the ranking of incumbent customers 645; a total number of ad impressions surfaced in association with a particular keyword 620; a number of ad impressions that were selected (e.g., clicked) by a user 625, and an average cost-per-click charged to the incumbent content provider 530. As illustrated, a click-through-rate may be offered by the incumbent content provider, or calculated by the server 250 of FIG. 2.

In embodiments, the UI 610 may be rendered upon a request by the incumbent content provider (e.g., customer who is making a bid for a certain position) at an appropriate website. In embodiments, the incumbent content provider may access the UI 610 upon satisfying a security measure, such as signing in with an authentic password. Accessing the UI 610 provides an interface for the incumbent content provider to interact a price-estimation tool (e.g., provide input criteria or view an estimated price for a candidate position).

Upon selecting the keyword 605 and providing the customer-history data 615, 620, 625, 630, 635, and 645 as parameters in the appropriate fields, the price-estimation procedure may be initiated. In one instance, the price-estimation procedure is initiated utilizing push-button functionality deployed at the UI 610. By way of example, the push-button functionality is employed as a control 640 (e.g., button, link, and the like) that accepts a single selection to launch the price-estimation tool, typically deployed at a keyword-service platform (KSP) product.

Returning to FIG. 2, the price-estimation procedure of the present invention, typically carried out by the price-estimation tool, will now be discussed. Initially, the position-adjustment component 252 is configured for generating a corrected rank model of the ranking of the competing incumbent customers absent consideration of the incumbent content provider. Also, in embodiments, the position-adjustment component 252 utilizes the corrected rank model to predict an adjusted average position of the incumbent content provider within the ranking without physically extracting bid results associated therewith from storage at the server 250. Generation and use of the corrected rank model is described herein with reference to FIG. 3.

Figure 3:
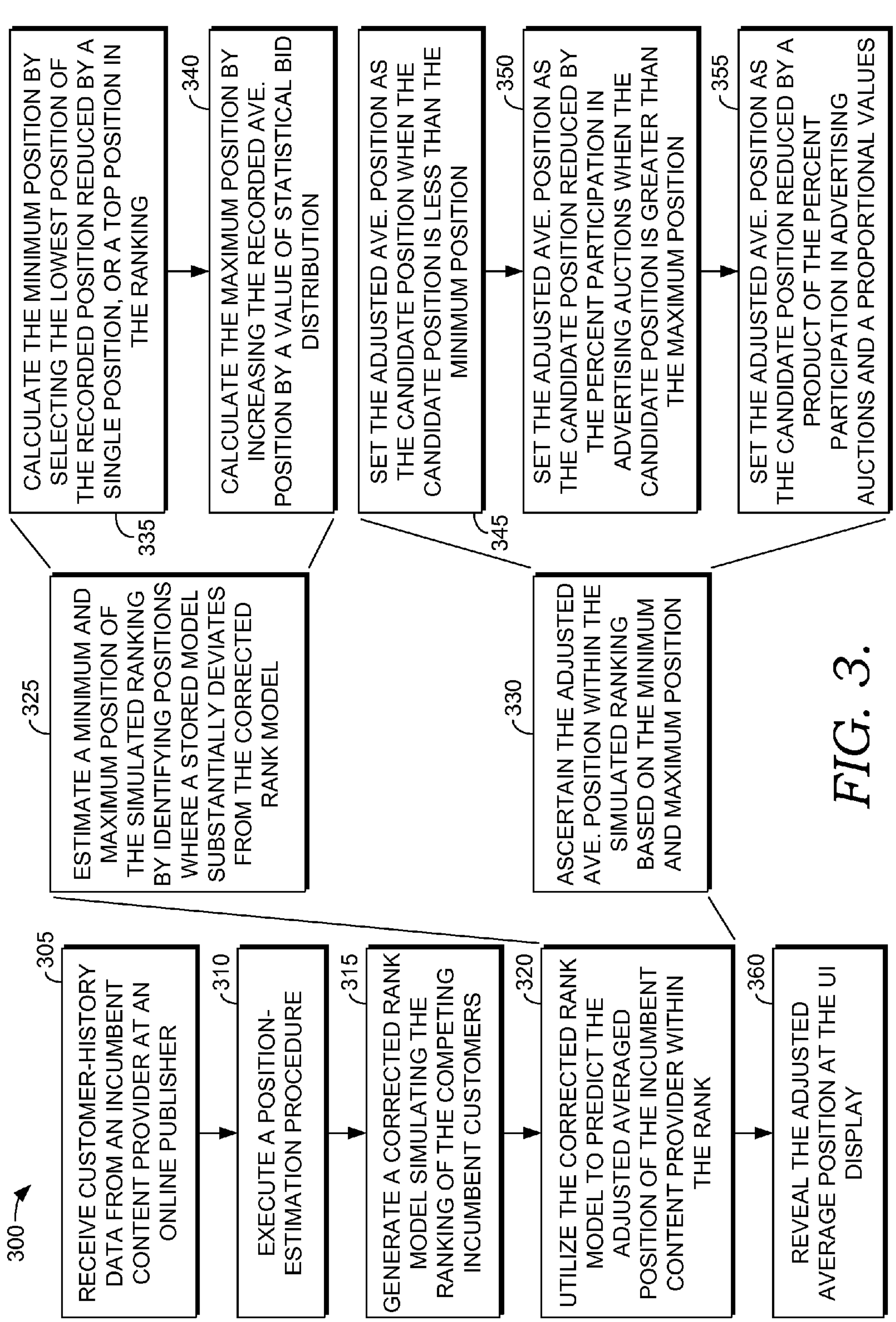
FIG. 3 is a flow diagram illustrating an overall method for determining an adjusted average position of a subject incumbent content provider within a ranking of incumbent customers competing to surface an ad impression on a page, in accordance with an embodiment of the present invention.

FIG. 3 is a flow diagram illustrating an overall method 300 for determining an adjusted average position of a subject incumbent content provider within a ranking of incumbent customers competing to surface an ad impression on a page, in accordance with an embodiment of the present invention. Initially, as discussed above, the price-estimation procedure includes receiving customer-history data from the incumbent content provider at an online publisher, as depicted at block 305. Typically, the customer-history data satisfies input criteria solicited at a UI display. In addition, the input criteria may request a candidate position that is desired by the incumbent content provider. As indicated at block 310, a position-estimation procedure is executed. In embodiments, the position-estimation procedure includes generating a corrected rank model simulating the ranking of the competing incumbent customers absent consideration of the incumbent content provider (see block 315), and utilizing the corrected rank model to predict the adjusted average position of the incumbent content provider within the ranking (see block 320). Advantageously, the prediction of the adjusted average position of the incumbent content provider may be made without physically extracting bid results associated therewith from storage at the online publisher. Thus, providing cost-prohibitive variations of data at the server (e.g., data sets having bid data associated with one of the competing incumbent customers removed and repeated for each of competing incumbent customers) is not necessary.

Figure 7:
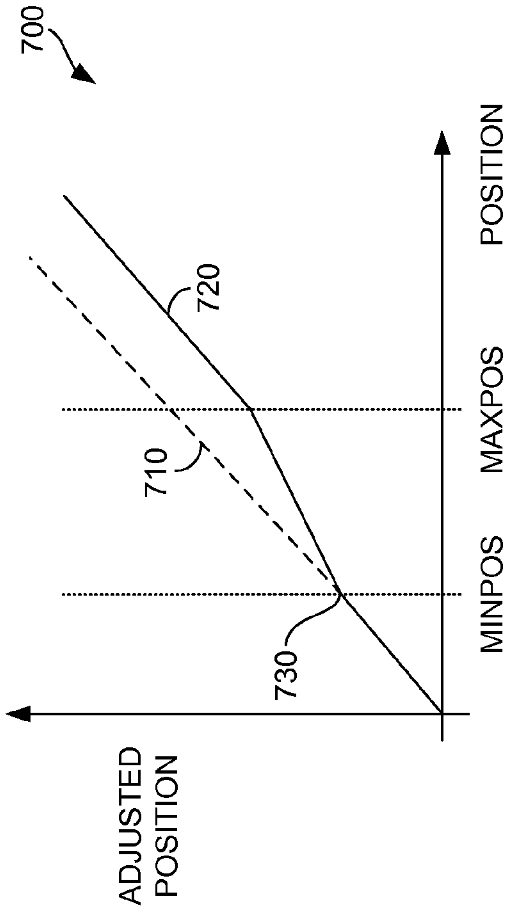
FIG. 7 is an exemplary graphical depiction that illustrates a deviation between a stored model of a ranking of competing incumbent customers and a corrected rank model that discounts an incumbent content provider's involvement in an advertising auction, in accordance with an embodiment of the present invention.

In one embodiment, utilizing the corrected rank model to predict the adjusted average position includes estimating a minimum position and a maximum position of the simulated ranking by identifying positions where a stored model substantially deviates from a corrected rank model, as depicted at block 325. Typically, the stored model considers bid results supplied by the incumbent content provider. Referring briefly to FIG. 7, an exemplary graphical depiction 700 that illustrates a deviation between a stored model of the ranking of the competing incumbent customers and the corrected rank model that discounts an incumbent content provider's involvement in an advertising auction is shown, in accordance with an embodiment of the present invention. As illustrated, the corrected rank model 720 deviates from the stored model 710 in a location 730 proximate to the minimum position. In embodiments, the angle of inclination of a line graph representing the corrected rank model 720 generally corresponds with the slope of a line graph representing the stored model for positions beyond the maximum position.

Returning to FIG. 3, estimating a minimum position of the simulated ranking includes calculating the minimum position by selecting the lowest position of the recorded average position reduced by a single position or a top position in the ranking, as indicated at block 335. It follows that if the average position of the incumbent content provider is below the average position, the minimum position is reduced by one incumbent customer upon negating the incumbent content provider. In embodiments, this calculation may be expressed by the following formula:

$$\text{Minimum Position (MinPos)}=\max\{\text{Recorded Average Position (AvePos)}-1,1\}$$

As such, the formula is a computation of the minimum position at which the stored bid data of the incumbent content provider may distort the estimated price of a bid for the candidate position.

Further, estimating a maximum position of the simulated ranking includes calculating the maximum position by increasing the recorded average position by value of a statistical bid distribution, as indicated at block 340. In embodiments, this calculation may be expressed by the following formula:

$$\text{Maximum Position (MaxPos)}=\max\{\text{Recorded Average Position (AvePos)}+0.75\}$$

As such, the formula is a computation of the maximum position at which the stored bid data of the incumbent content provider may distort the estimated price of a bid for the candidate position. In addition, the value of 0.75 is used as a corrective factor to adjust for statistical bid distribution within a set of competing incumbent customers. In one instance, the value of statistical distribution accounts for the bid being skewed toward high positions, as opposed to being distributed at regular intervals. In another instance, a statistical evaluation of the bid distribution may be performed (e.g., real-time analysis) to determine a value of the statistical bid distribution specific to a particular advertising auction.

Based on the customer-history data, the minimum position, and the maximum position, the adjusted average position within the simulated ranking, consistent with the corrected rank model, is ascertained, as indicated at block 330. A percent participation in advertising auctions is taken into consideration when ascertaining the adjusted average position. As discussed above, the percent participation in advertising auctions (PPA) is derived from a ratio of the surfaced ad impressions associated with the incumbent content provider's account to a total number of surfaced ad impressions submitted by the competing incumbent customers. Use of the PPA flows from the following demonstrative bidding situations. If the incumbent content provider participates in substantially all of the auctions, and attains position 1 consistently, that content provider should be trying to overcome a second-place bidder, not itself. Accordingly, use of the PPA to adjust a price estimation facilitates avoiding this situation where the incumbent content provider competes against itself. Conversely, if the incumbent content provider participates in a lower percentage of the auctions, and rarely attains position 1, the bid adjustment should be slight, because the content provider is competing against other bidders more than itself. As such, the PPA tracks the impact of the incumbent content provider in the advertising auction and assists in nullifying that impact.

In embodiments, ascertaining the adjusted average position within the simulated ranking consistent with the corrected rank model includes, but is not limited to, the following steps, performed in no particular order: setting the adjusted average position as the candidate position proposed by the incumbent content provider when the candidate position is less than the minimum position (see block 345); and setting the adjusted average position as the candidate position reduced by the percent participation in advertising auctions when the candidate position is greater than maximum position (see block 350). In addition, when the candidate position is ranked between the minimum position and the maximum position, a proportion of where the candidate position is ranked between the minimum position and the maximum position is derived, as indicated at block 355. In this instance, the adjusted average position is set as the candidate position reduced by a product of the proportion and the percent participation in advertising auctions. In embodiments, this calculation adjusted average position (AdjAvePos) may be expressed by the following formula:

$$AdjAvePos. = \begin{cases} \text{Candidate Position } (Pos), & \text{if} \quad Pos \le MinPos \\ Pos - PPA, & \text{if} \quad Pos \ge MaxPos \\ Pos - PPA * (Pos - MinPos / & \text{if} \quad \in [MinPos, MaxPos] \\ (MaxPos - MinPos), & \end{cases}$$

Accordingly, the adjusted average position references an incumbent content provider's estimated position within the ranking of the competing incumbent providers in the corrected rank model where the bid results associated with the incumbent content provider are not taken into account.

Upon determining the adjusted average position it may be displayed at the UI display 210 of FIG. 2, as indicated at block 360. Turning briefly to FIG. 5, an illustrative screen display 500 of an exemplary UI 510 for receiving and presenting corrected bid estimates is shown, in accordance with an embodiment of the present invention. As depicted, an adjusted average position 520 is output based on the initial price-estimation procedure, discussed above, as a function of a user-desired bid value for the keyword "flower" 505. In addition, an adjusted cost-per-click value 530 may be determined, as discussed below with reference to FIG. 4, and presented at the UI 510.

Returning to FIG. 2, the cost-per-click adjustment component 253 is configured for generating a corrected price model that ignores the influence of participation of the incumbent content provider in an advertising auction in conjunction with the participation of competing incumbent customers. In embodiments, the corrected price model and the submitted candidate position, discussed above, are utilized to predict the adjusted cost-per-click value for the incumbent content provider.

Figure 4:
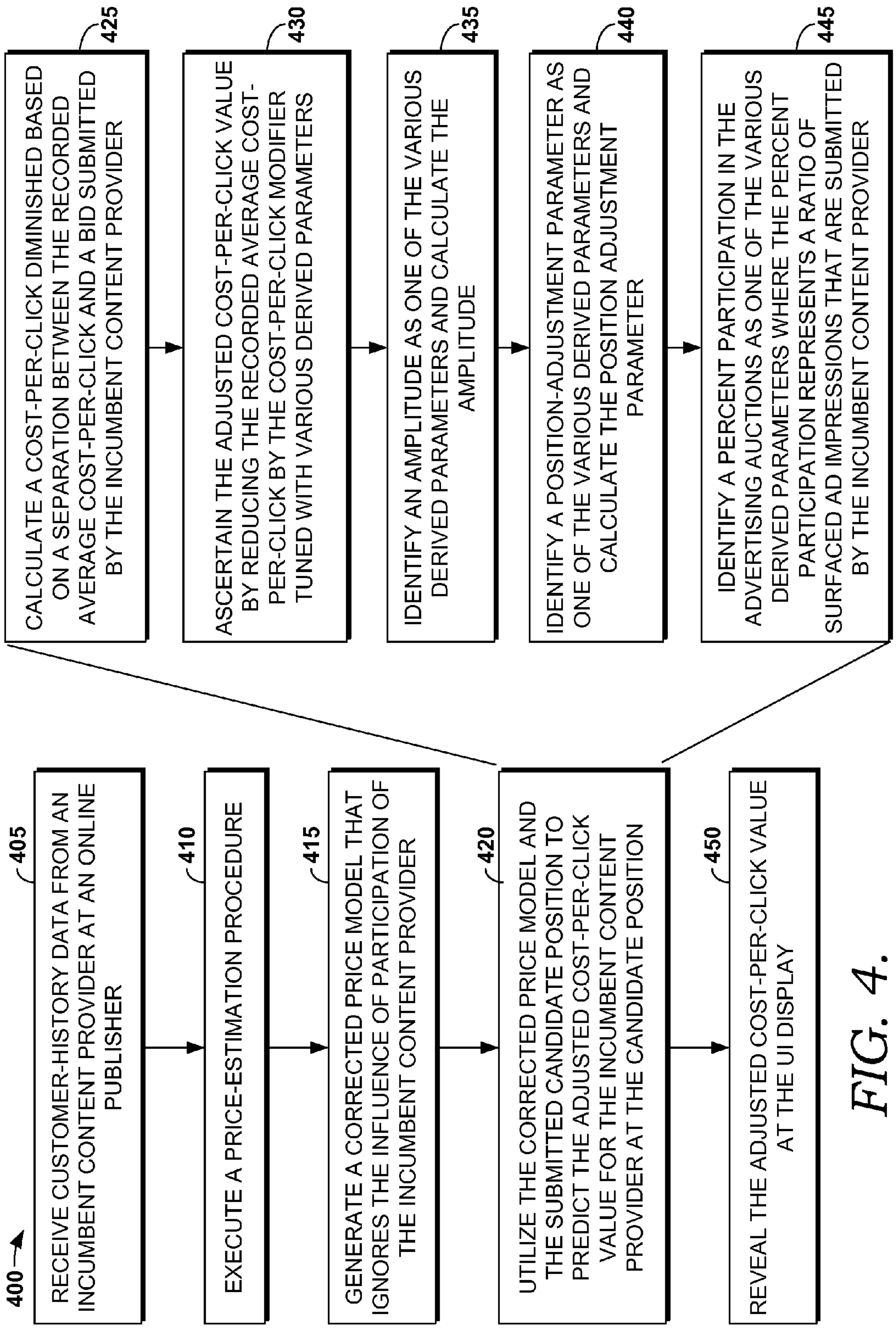
FIG. 4 is a flow diagram illustrating an overall method for determining an adjusted cost-per-click value associated with a candidate position submitted by a subject incumbent content provider within a grouping of incumbent customers competing to surface an ad impression on a page, in accordance with an embodiment of the present invention.
Figure 5:
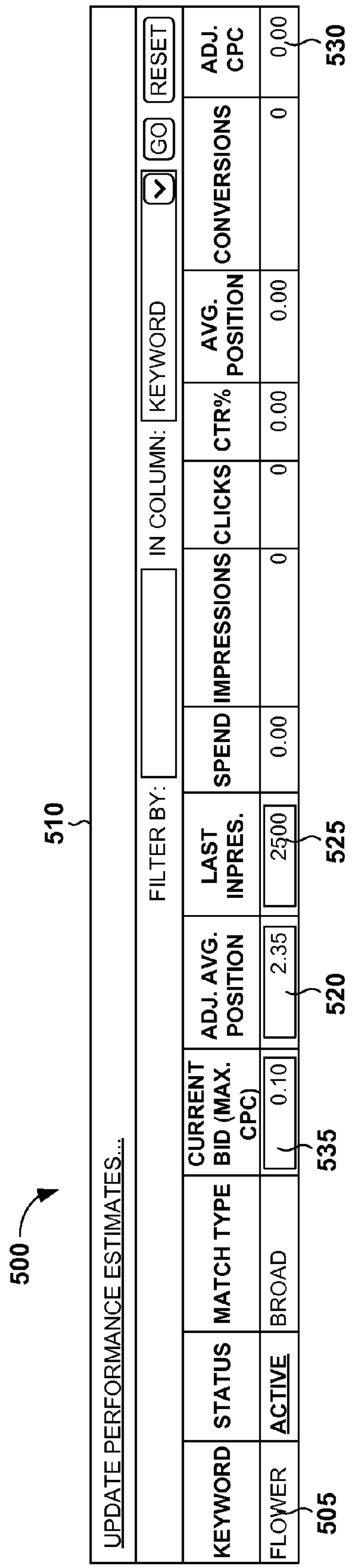
FIGS. 5-6 are illustrative screen displays of exemplary user interfaces for receiving input criteria and presenting corrected bid estimates, in accordance with an embodiment of the present invention.

Referring to FIG. 4, a price-estimation procedure performed by the cost-per-click adjustment component 253 will now be discussed. Initially, FIG. 4 shows a flow diagram illustrating an overall method 400 for determining an adjusted cost-per-click value associated with a candidate position submitted by a subject incumbent content provider within a grouping of incumbent customers competing to surface an ad impression on a page, in accordance with an embodiment of the present invention. As discussed above, customer-history data is received from an incumbent content publisher at an online publisher, as indicated at block 405. As indicated at block 410, a price-estimation procedure 410 is invoked. The price-estimation procedure includes generating a corrected price model that ignores the influence of participation of the incumbent content provider in an advertising auction in conjunction with the participation of competing incumbent customers, as indicated at block 415. In embodiments, the price-estimation procedure further includes utilizing the corrected price model and the submitted candidate position to predict the adjusted cost-per-click value for the incumbent content provider, as indicated at block 420.

Figure 8:
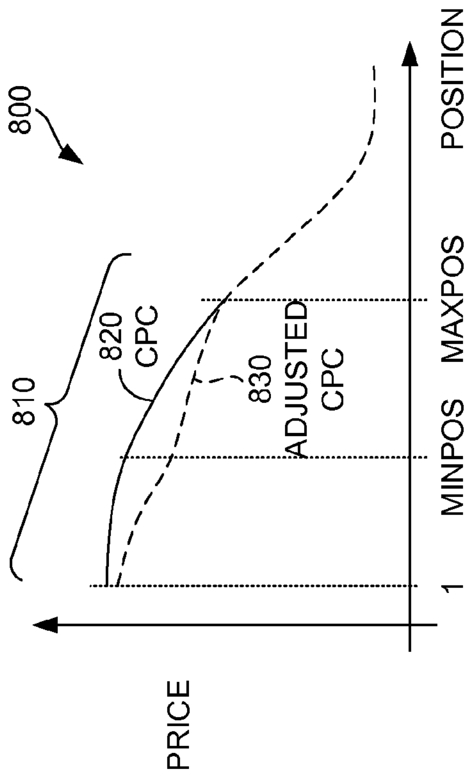
FIG. 8 is an exemplary graphical depiction that illustrates a deviation between a pricing structure of competing incumbent customers and a corrected price model that discounts an incumbent content provider's involvement in an advertising auction, in accordance with an embodiment of the present invention.

In one instance, predicting the adjusted cost-per-click value includes calculating a cost-per-click modifier from a recorded average cost-per-click provided in the input criteria, as discussed above. In other embodiments, the recorded average cost-per-click may be derived from a stored bid value utilizing a second-bid approach, where the cost-per-click value is based on the value of the bid submitted by a customer ranked immediately below the incumbent content provider, as indicated at block 425. The recorded average cost-per-click may be diminished based on a separation between the recorded average cost-per-click and a bid submitted by the incumbent content provider. This separation is depicted at FIG. 8. FIG. 8 shows an exemplary graphical depiction 800, in accordance with an embodiment of the present invention. The graphical depiction 800 illustrates a deviation between the recorded average cost-per-click 820 of a stored pricing structure including all competing incumbent customers and an corrected price model 830 that discounts an incumbent content provider's involvement in an advertising auction.

An interval of separation 810 is illustrated that denotes positional locations of the separation. The interval of separation relates to an incumbent content provider's impact on the estimation of a bid price. If the average position of the content provider resides between the minimum position and the maximum position (calculated above), the incumbent content provider's impact is great. If the average position of the content provider resides below the maximum position, the impact vanishes. If the average position resides above minimum position, the impact is decreasing but could affect each of the lower bids based on the distribution, or skew, of the bids stored in association with the advertising auction.

In embodiments, as indicated at block 425 of FIG. 4, calculating the cost-per-click modifier from a recorded average cost-per-click (CPC) that is diminished based on a separation between the recorded average cost-per-click and a bid submitted by the incumbent content provider is expressed by the following formula:

$$\text{Cost-Per-Click Modifier } (d\text{CPC})=\text{CPC}*(1-r\text{CPC})$$

As such, the separation between the recorded average cost-per-click (CPC) and a bid submitted by the incumbent content provider is represented by 1−rCPC, where rCPC is the ratio of the stored bid over the stored average cost-per-click associated with the incumbent content provider. The rCPC is utilized in the calculation as it tracks a ratio of a monetary value of a bid for a next higher bidder to the monetary value of the bid submitted by the incumbent content provider.

Returning to FIG. 4, the adjusted cost-per-click value is ascertained by reducing the recorded average cost-per-click by the cost-per-click modifier tuned with various derived parameters, as indicated at block 430. This calculation of the adjusted cost-per-click value (AdjCPC) may be expressed by the following formula:

$$\text{AdjCPC}=\text{CPC}-d\text{CPC}*\text{PPA}*\text{Ampl}*\text{PosAdj}$$

As such, in embodiments, the various derived parameters used to tune the cost-per-click modifier (dCPC), calculated above, include an amplitude (Ampl), a position-adjustment parameter (PosAdj), and the percent participation in auctions (PPA) that is calculated above as that percentage of a quantity of surfaced ad impressions provided by the competing incumbent customers are also provided by the incumbent content provider, as depicted at block 445. It should be understood and appreciated by those of ordinary skill in the art that other types of suitable parameters may be used in place of, or in combination with, any one or more of the various derived parameters mentioned herein, and that embodiments of the present invention are not limited to those derived parameters of the amplitude, the position-adjustment parameter, and the percent participation in auctions.

As depicted at block 435, the amplitude is identified as one of the various derived parameters utilized to tune the cost-per-click modifier. Generally, the amplitude represents a separation between the corrected price model and a stored model, as illustrated at FIG. 8. As discussed above, the stored model considers the bid results supplied by the incumbent content provider.

Calculating the amplitude, in accordance with an embodiment of the present invention, will now be discussed. When a recorded average position (AvePos) of the incumbent content provider is below a predefined threshold amount, the amplitude is set to a value of one. Generally, the recorded average position (AvePos) is a position within a ranking of the competing incumbent customers maintained by the stored model. When the recorded average position (AvePos) of the incumbent content provider is above a predefined threshold amount the amplitude is set to a value of a ratio. Typically, the ratio is inversely proportional to the recorded average position. This calculation of the amplitude (Ampl) may be expressed by the following formula:

$$Ampl=\begin{cases}1, & \text{if } AvrPos\le 1.5\\ 1/(AvrPos-0.5), & \text{if } AvrPos\ge 1.5\end{cases}$$

As such, in embodiments, the predefined threshold is set at 1.5. But, embodiments of the present invention utilize predefined thresholds of other numerical values.

As depicted at block 440 of the method 400 of FIG. 4, the position-adjustment parameter is identified as one of the various derived parameters utilized to tune the cost-per-click modifier. Typically, the position-adjustment parameter represents an estimated position of the incumbent content provider within the ranking of the competing incumbent providers consistent with the corrected price model.

Calculating the position-adjustment parameter, in accordance with an embodiment of the present invention, will now be discussed. Initially, an interval within the ranking of the competing incumbent customers is identified where the stored model substantially deviates from a corrected price model. A minimum position and a maximum position are then derived from the ranking. Typically, the minimum position and the maximum position are each located at separate ends of the interval within the ranking. Next, the candidate position submitted by a subject incumbent content provider is received as part of the input criteria. Also, a ratio that is inversely proportional to a distance between the minimum position and the candidate position is generated. Utilizing the minimum position (MinPos), the maximum position (Max Pos), the ratio of 1/(1+2*(MinPos−Pos)), and the candidate position (Pos), the position-adjustment parameter (PosAdj) may be generated. In embodiments, the generation of the position-adjustment parameter (PosAdj) may be expressed by the following formula:

$$PosAdj=\begin{cases}1/(1+2*(MinPos-Pos)), & \text{if } Pos\le MinPos\\ 0, & \text{if } Pos\ge MaxPos\\ (MaxPos-\text{Position})^2/(MaxPos-MinPos)^2, & \text{if } \in[MinPos, MaxPos]\end{cases}$$

As such, the position-adjustment parameter (PosAdj) may be set to the ratio 1/(1+2*(MinPos−Pos)) when the candidate position is lower in the ranking than the minimum position. When the candidate position is higher in the ranking than the maximum position, the position-adjustment parameter is set to a null value. And, when the candidate position is within the interval between the minimum position and the maximum position, the position-adjustment parameter is set to a value of a ratio of a distance between the maximum position, or the minimum position to the candidate position, and a size of the interval. In embodiments, this ratio is represented by $(\text{MaxPos}-\text{Position})^2/(\text{MaxPos}-\text{MinPos})^2$.

With reference to FIG. 2, this exemplary system architecture 200 is but one example of a suitable environment that may be implemented to carry out aspects of the present invention and is not intended to suggest any limitation as to the scope of use or functionality of the invention. Neither should the illustrated exemplary system architecture be interpreted as having any dependency or requirement relating to any one or combination of the components 251, 252, and 253 as illustrated. In some embodiments, one or more of the components 251, 252, and 253 may be implemented as stand-alone devices. In other embodiments, one or more of the components 251, 252, and 253 may be integrated directly into the computing device 220. It will be understood by those of ordinary skill in the art that the components 251, 252, and 253 illustrated in FIG. 2 are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting (e.g., although only one presentation component 215 is shown, many more may be communicatively coupled to the computing device 220).

Although the price-estimation tool is described with reference to a position-estimation procedure and a price-estimation procedure with reliance on specific parameters and formulas, it should be understood and appreciated by those of ordinary skill in the art that other types of suitable computations that negate the impact of an incumbent content provider on price estimations may be used, and that embodiments of the present invention are not limited to those procedures described herein. In addition, although a candidate position described to the incumbent content provider is received to generate an adjusted cost-per-click value, a target cost-per-click value (e.g., aligned with the budget constraints of the incumbent content provider) may by provided to determine an expected position with the ranking of the corrected rank model. Further, various other inputs may be utilized to determine various adjusted outputs from the corrected rank model that may assist in setting advertising expenditures within a future time frame.

The present invention has been described in relation to particular embodiments, which are intended in all respects to be illustrative rather than restrictive. Alternative embodiments will become apparent to those of ordinary skill-in-the-art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. One or more computer storage media having computer-executable instructions embodied thereon that, when executed by a processor, perform a method for determining an adjusted average position of a subject incumbent content provider within a ranking of incumbent customers competing to surface an ad impression on a page, the method comprising:

receiving customer-history data from the incumbent content provider at an online publisher, wherein the customer-history data satisfies input criteria solicited at a UI display;

executing a position-estimation procedure, wherein the position-estimation procedure comprises:

(a) generating a corrected rank model simulating the ranking of the competing incumbent customers absent consideration of the incumbent content provider;

(b) estimating a minimum position and a maximum position of the simulated ranking by identifying positions where a stored model deviates from a corrected rank model, wherein the stored model considers bid results supplied by the incumbent content provider; and (c) utilizing the corrected rank model to predict the adjusted average position of the incumbent content provider within the ranking without extracting bid results associated therewith from storage at the online publisher, wherein the adjusted average position is found within the simulated ranking, and wherein the adjusted average position is predicted as a function of the customer-history data, the minimum position, and the maximum position; and revealing the adjusted average position at the UI display.

2. The one or more computer storage media of claim 1, wherein the input criteria for estimating the minimum position and the maximum position comprises a recorded average position, of the incumbent content provider, within the ranking of the stored model, and wherein the input criteria for ascertaining the adjusted average position comprises a candidate position proposed by the incumbent content provider and a percent participation in advertising auctions.

3. The one or more computer storage media of claim 2, wherein the customer-history data that is provided to satisfy the solicited input criteria comprises information, recorded by the online publisher, within a predetermined timeframe and conveyed to the incumbent content provider for submission.

4. The one or more computer storage media of claim 2, wherein the percent participation in advertising auctions is derived from a ratio of the surfaced ad impressions associated with the incumbent content provider's account to a total number of surfaced ad impressions submitted by the competing incumbent customers.

5. The one or more computer storage media of claim 4, wherein the ranking of incumbent customers completing to surface an ad impression on a page comprises an ordering of those completing incumbent customers that commonly indicated a search for invoking rendering of their respective ad impressions, and wherein the ordering is based on a bid value submitted by each of the competing incumbent customers.

6. The one or more computer storage media of claim 5, wherein the adjusted average position comprises an incumbent content provider's estimated position within the ranking of the competing incumbent providers in the corrected rank model where the bid results associated with the incumbent content provider are not taken into account.

7. The one or more computer storage media of claim 1, wherein ascertaining the adjusted average position within the simulated ranking consistent with the corrected rank model comprises:

setting the adjusted average position as the candidate position proposed by the incumbent content provider when the candidate position is less than the minimum position;

setting the adjusted average position as the candidate position reduced by the percent participation in advertising auctions when the candidate position is greater than the maximum position; and when the candidate position is ranked between the minimum position and the maximum position, deriving a proportion of where the candidate position is ranked between the minimum position and the maximum position and setting the adjusted average position as the candidate position reduced by a product of the proportion and the percent participation in advertising auctions.

8. One or more computer storage media having computer-executable instructions embodied thereon that, when executed by a processor, perform a method for determining an adjusted cost-per-click value associated with a candidate position submitted by a subject incumbent content provider within a grouping of incumbent customers competing to surface an ad impression on a page, the method comprising: receiving customer-history data from the incumbent content provider at an online publisher, wherein the customer-history data satisfies input criteria solicited at a UI display;

executing a price-estimation procedure, the price-estimation procedure comprising:

(a) generating a corrected price model that ignores the influence of participation of the incumbent content provider on an advertising auction in conjunction with the competing incumbent customers;

(b) calculating a cost-per-click modifier from a recorded average cost-per-click, included in the input criteria, that is diminished based on a separation between the recorded average cost-per-click and a bid submitted by the incumbent content provider; and (c) utilizing the corrected price model and the submitted candidate position to predict the adjusted cost-per-click value for the incumbent content provider at the candidate position without removing bid results associated with the incumbent content provider from consideration, wherein the adjusted cost-per-click value is predicted by reducing the recorded average cost-per-click by the cost-per-click modifier tuned with various derived parameters; and revealing the adjusted cost-per-click value at the UI display.

9. The one or more computer storage media of claim 8, wherein the advertising auction comprises:

receiving bids submitted by the competing incumbent customers; and ranking the competing incumbent customers.

10. The one or more computer storage media of claim 9, wherein the method further comprises determining a value of a cost-per-click for the customer of the competing incumbent customers.

11. The one or more computer storage media of claim 8, wherein the price-estimation procedure further comprises:

identifying an amplitude as one of the various derived parameters utilized to tune the cost-per-click modifier tuned, wherein the amplitude represents a separation between the corrected price model and a stored model, and wherein the stored model considers the bid results supplied by the incumbent content provider; and calculating the amplitude.

12. The one or more computer storage media of claim 11, wherein calculating the amplitude comprises:

setting the amplitude to a value of one when a recorded average position of the incumbent content provider is below a predefined threshold amount, wherein the recorded average position is a position within a ranking of the competing incumbent customers maintained by the stored model;

generating a ratio that is inversely proportional to the recorded average position; and setting the amplitude to a value of the ratio when the recorded average position of the incumbent content provider is above a predefined threshold amount.

13. The one or more computer storage media of claim 8, wherein the price-estimation procedure further comprises:

identifying a position-adjustment parameter as one of the various derived parameters utilized to tune the cost-per-click modifier, wherein the position-adjustment parameter represents an estimated position of the incumbent content provider within the ranking of the competing incumbent providers consistent with the corrected price model; and calculating the position-adjustment parameter.

14. The one or more computer storage media of claim 13, wherein calculating the position-adjustment parameter comprises:

identifying an interval within the ranking of the competing incumbent customers where the stored model substantially deviates from a corrected price model; and deriving a minimum position and a maximum position from the ranking, wherein the minimum position and the maximum position are each located at separate ends of the interval.

15. The one or more computer storage media of claim 14, wherein calculating the position-adjustment parameter further comprises:

receiving the candidate position submitted by a subject incumbent content provider as part of the input criteria;

generating a ratio that is inversely proportional to a distance between the minimum position and the candidate position;

setting the position-adjustment parameter to a value of the ratio when the candidate position is lower in the ranking than the minimum position;

setting the position-adjustment parameter to a null value when the candidate position is higher in the ranking than the maximum position; and setting the position-adjustment parameter to a value of a ratio of a distance between the maximum position or the minimum position to the candidate position, and a size of the interval, when the candidate position is within the interval.

16. The one or more computer storage media of claim 8, wherein the price-estimation procedure further comprises identifying a percent participation in the advertising auctions, of the incumbent content provider, as one of the various derived parameters utilized to tune the cost-per-click modifier, wherein the percent participation represents a percentage of a quantity of surfaced ad impressions provided by the competing incumbent customers are also provided by the incumbent content provider.

17. A computer system for deriving an adjusted cost-per-click value for a subject incumbent content provider within a grouping of incumbent customers competing to surface an ad impression on a page, the system comprising:

a server device that invokes a price-estimation procedure configured for determining the adjusted cost-per-click value, wherein the price-estimation procedure is implemented on, at least, the following components:

(a) an input component for receiving input criteria from the incumbent content provider, wherein the input criteria comprises customer-history data collected by the server and a candidate position within a ranking of the competing incumbent customers that is attractive to the incumbent content provider;

(b) a position-adjustment component for generating a corrected rank model of the ranking of the competing incumbent customers absent consideration of the incumbent content provider, for estimating a minimum position and a maximum position where a stored model deviates from a corrected rank model, wherein the stored model considers bid results supplied by the incumbent content provider, and for utilizing the corrected rank model to predict an adjusted average position of the incumbent content provider within the ranking without extracting bid results associated therewith from storage at the server, wherein the adjusted average position is predicted as a function of the customer-history data, the minimum position, and the maximum position; and (c) a cost-per-click adjustment component for generating a corrected price model that ignores the influence of participation of the incumbent content provider in an advertising auction in conjunction with the competing incumbent customers, and utilizing the corrected price model and the candidate position to predict the adjusted cost-per-click value for the incumbent content provider; and a presentation device for revealing the adjusted cost-per-click value at a UI display.

* * * * *